United States Patent [19]

Moulding, Jr. et al.

[11] Patent Number: 4,869,392

[45] Date of Patent: Sep. 26, 1989

[54] MEDICATION DISPENSER AND METHOD OF DISPENSING MEDICATION

[76] Inventors: Thomas S. Moulding, Jr., 214 Via La Soledad, Redondo Beach, Calif. 90277; Donald G. Ellis, Geneva Park, Boulder, Colo. 80302

[21] Appl. No.: 99,039

[22] Filed: May 16, 1986

Related U.S. Application Data

[63] Continuation-in-part of Ser. No. 864,144, May 16, 1986, abandoned, which is a continuation of Ser. No. 547,019, Oct. 31, 1983, abandoned.

[51] Int. Cl.[4] .................................... B65G 59/00

[52] U.S. Cl. .................................... 221/1; 221/2; 221/12; 221/15; 221/155; 221/241; 221/281; 221/288; 221/298

[58] Field of Search ..................... 221/1, 2, 3, 4, 5, 7, 221/8, 92, 153, 154, 155, 241, 242, 252, 263, 264, 265, 281, 288, 298, 299, 300, 304, 311, 15, 12; 222/454, 544, 547, 559, 561, 564; 364/479; 206/528, 534, 538, 540

[56] References Cited

U.S. PATENT DOCUMENTS

| | | | |
|---|---|---|---|
| 3,133,670 | 5/1964 | Heyer | 221/7 X |
| 3,332,576 | 7/1967 | Hamilton | 221/264 X |
| 3,556,342 | 1/1971 | Guarr | 221/2 |
| 3,730,388 | 5/1973 | Bender | 221/4 X |
| 3,823,844 | 7/1974 | Linkemer et al. | 221/7 X |
| 3,837,139 | 9/1974 | Roseberg | 221/7 X |
| 3,968,900 | 7/1976 | Stambuk | 221/3 |
| 4,117,956 | 10/1978 | von Schuckmann | 221/288 |
| 4,354,619 | 10/1982 | Wippermann et al. | 221/263 |
| 4,396,828 | 8/1983 | Dino et al. | 221/7 X |
| 4,460,106 | 7/1984 | Moulding, Jr. et al. | 221/4 X |
| 4,473,884 | 9/1984 | Behl | 221/2 X |

FOREIGN PATENT DOCUMENTS

| | | | |
|---|---|---|---|
| 491239 | 3/1953 | Canada | 206/540 |

*Primary Examiner*—Joseph J. Rolla

*Assistant Examiner*—Edward S. Ammeen

[57] ABSTRACT

A medication dispenser includes a container having a main compartment, a selection compartment, and an exit compartment whereby a pill or the like is dispensed from the container by passage from the main compartment, through the selection compartment, and to the exit compartment. The configuration of the pill selection compartment may be selectively varied and adjusted into a preselected configuration substantially conforming to the shape and size of a pill contained in the main compartment. A flexible first gate selectively extends between the selection compartment and the main compartment, a second gate selectively extends between the selection compartment and the exit compartment, and a third gate selectively extends across the exit compartment, near the container exterior. Initially, the second gate is in an extended position, and the first and third gates are in nonextended positions. A single pill is then maneuvered from the main compartment to the selection compartment and positioned adjacent to the second gate. Thereafter, the second gate is moved to a nonextended position, and substantially simultaneously the first and third gates are each moved to an extended position whereby the pill can pass from the selection compartment to the exit compartment and whereby the pills in the main compartment cannot move into the pill selection compartment. The pill interrupts a light beam located in the exit compartment as it passes from the selection compartment to the exit compartment such that the interruption of the light beam indicates the dispensing of the pill.

86 Claims, 4 Drawing Sheets

MEDICATION DISPENSER AND METHOD OF DISPENSING MEDICATION

This patent application is continuation-in-part to the inventors' U.S. patent application Ser. No. 864,144, filed May 16, 1986, entitled "Medication Dispenser And Method Of Dispensing Medication", now abandoned, which patent application is a continuation to the inventors' U.S. patent application Ser. No. 547, 019, filed Oct. 31, 1983, entitled "Medication Dispenser and Method of Dispensing Medication", now abandoned, which patent application is related to the inventor's then copending U.S. patent application Ser. No. 317,430, filed Nov. 2, 1981, entitled "Pill Dispenser", now U.S. Patent No. 4,460,106, the subject matter of which is incorporated herein by reference. All of these applications and the patent have been and are commonly owned.

BACKGROUND OF THE INVENTION

The dispensing of medication, especially in hospitals, nursing homes and the like, presently involves archaic, labor intensive, error prone procedures.

The traditional method of dispensing medication on hospital floors requires the nurses on each shift to deposit the prescribed amount of medication for a particular patient into a cup. At the appropriate time, the nurse takes the medication filled cup to the designated patient and records on a chart the amount and kind of medication given to the patient, the time when the medication is given, and the identity of the patient to whom the medication is given. In many hôspitals and nursing homes over thirty percent of nursing time is spent dispensing and recording the dispensing of medication, thereby contributing to the ever increasing cost of medical care and diverting nursing skills from more important functions and duties. Moreover, such traditional method of dispensing medication permits human error in any one of several steps of the method such as selecting the proper medication from several available medications, calculating the proper amount of medication, delivering the medication to the proper person, delivering the medication at the proper time, accurately and completely recording or "charting" the abovementioned data concerning the dispensing of the medication, maintaining the physical copy of the record in the patient's chart or in a file, etc.

Sometimes medication is left at the bedside of the hospital patients who are not critically ill and who are considered to be of sound mind and reliable for self administration of the medicine by the patients. However, these patients often will not take the medication as directed, and thus, no accurate record of medication actually ingested can be made.

Patients living at home are often left with the responsibility of following directions to take medication. In addition to those circumstances where such patients intentionally fail to follow the instructions, such patients, especially feeble minded or elderly patients, often forget to take the medicine, take the wrong amount of medication, take the medication at the wrong time, take one medication according to the instructions for another medication, etc. Many patients are forced into nursing homes and sometimes into hospitals solely to insure that they take medication according to prescribed instructions. Such a forced residence can be cruel to a patient who wants to stay home and is oppressively expensive for those persons or entities who pay for the hospital or nursing home stay.

SUMMARY OF THE INVENTION

A medication dispenser includes a container having a main compartment, a selection compartment, and an exit compartment whereby a pill or the like is dispensed from the container by passage from the main compartment, through the selection compartment, and to the exit compartment. Means are provided for selectively varying and adjusting the configuration of the pill selection compartment into a preselected configuration substantially conforming to the shape and size of a pill contained in the main compartment. A flexible first gate selectively extends between the selection compartment and the main compartment, a second gate selectively extends between the selection compartment and the exit compartment, and a third gate selectively extends across the exit compartment, near the container exterior.

Initially, the second gate is in an extended position, and the first and third gates are in nonextended positions. A single pill is then maneuvered from the main compartment to the selection compartment and positioned adjacent to the second gate. Thereafter, the second gate is moved to a nonextended position, and substantially simultaneously the first and third gates are moved to an extended position, whereby the pill can pass from the selection compartment to the exit compartment and whereby the pills in the main compartment cannot move into the pill selection compartment. A pill interrupts a light beam located in the exit compartment as it passes from the selection compartment to the exit compartment such that the interruption of the light beam indicates the dispensing of the pill.

Means can be provided to prevent the second gate from moving to a non-extended position unless certain conditions and circumstances exist. For example, if it is not the appropriate time for a person to take a pill, or if the person has already taken his allocation of pills for a day, the second gate would be prevented from moving to a non-extended position, which would prevent any pill from being dispensed from the container. Thus, the present invention provides a system for effective regulation, monitoring and accounting of the dispensing of pills or the like to a patient.

BRIEF DESCRIPTION OF THE DRAWINGS

The invention will be described with reference to the accompanying drawings, wherein:

FIG. 4 is a schematic rendering of a light source, mirror, and photodiode system for sensing the dispensing of a pill or the like;

DESCRIPTION OF A PREFERRED EMBODIMENT

Figure 1:
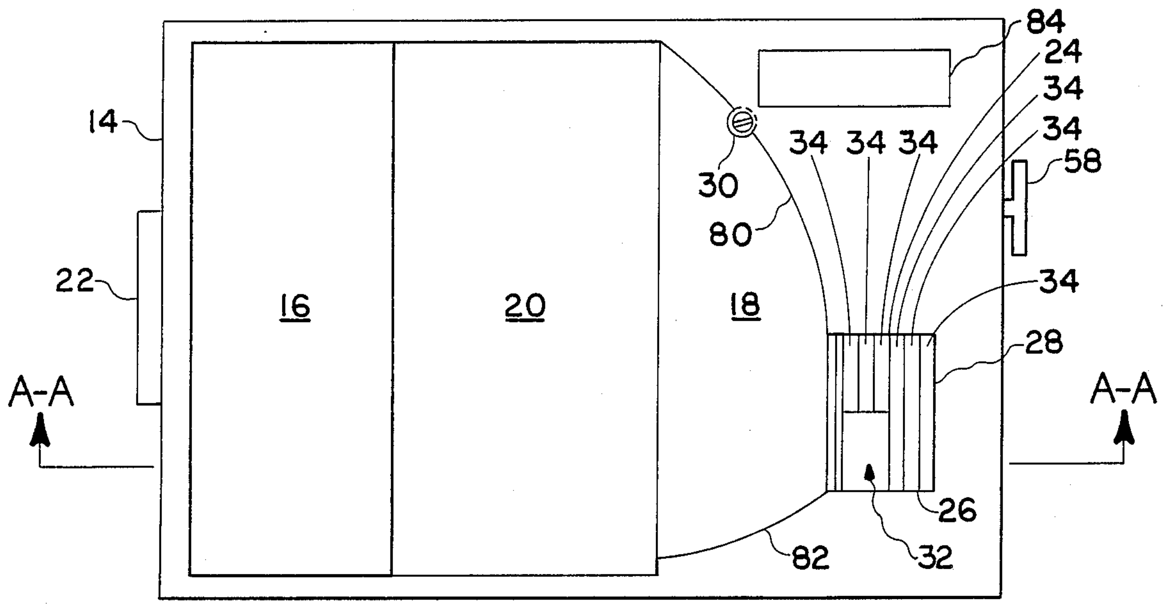
FIG. 1 is a top view of a medication dispenser in accordance with one of embodiment of the present invention.
Figure 2:
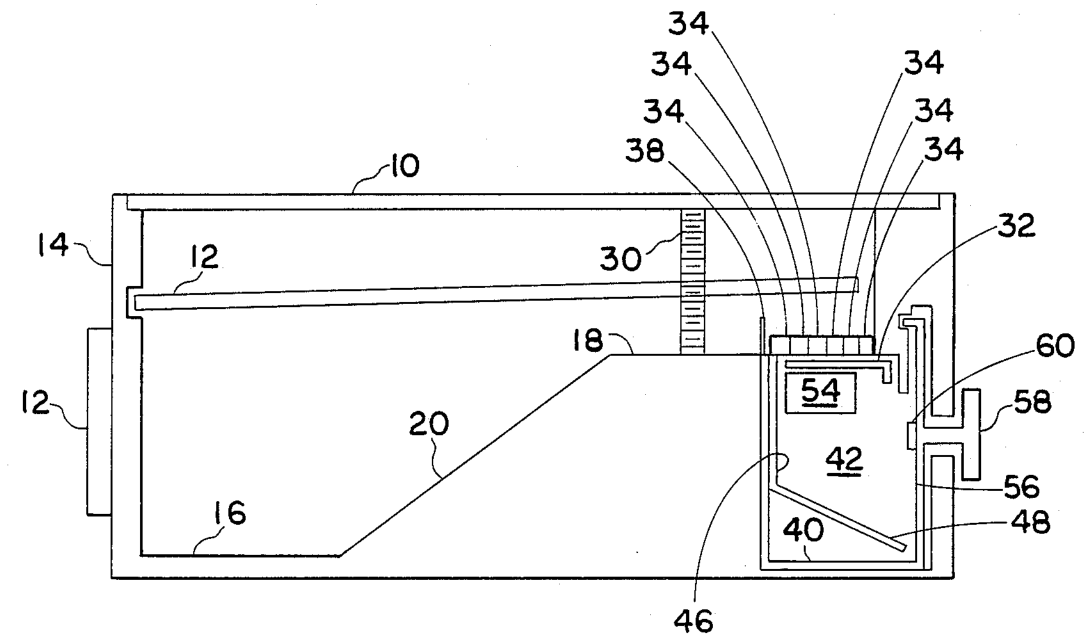
FIG. 2 is a side, cross-sectional view of the medication dispenser shown in FIG. 1 taken along the line A-A.

Referring now to the drawings wherein like reference numerals and symbols refer to the same item, there is shown in FIGS. 1 and 2 a medication dispenser according to a preferred embodiment of the present invention. The medication dispenser includes a box like container provided with a transparent top cover 10. Mounted within the container below the top cover 10, is a transparent plate 12 extending across the container interior. The plate 12 is pivotable about an end thereof adjacent to a container rear end wall 14. Preferably the plate 12 is hinged to the rear end wall 14, although the end of the plate 12 may also rest loosely within a slot extending across the rear end wall 14.

The container further includes a bottom floor 16, an upper shelf or ledge 18, and an inclined wall 20 extending between the bottom floor 16 and the upper ledge 18. The plate 12, the bottom floor 16, the inclined wall 20, the upper ledge 18, the rear end wall 14, and the two opposing side walls of the container generally define a main compartment in which medication in the form of pills, capsules, tablets or the like are normally disposed. The pills are deposited in the main compartment through a selectively plugged aperture in the rear end wall 14. Preferably the plug 22 is threadably, selectively secured within the aperture in the rear end wall 14 and preferably the plug 22 may be selectively locked into the aperture by any of several conventional locking means.

Located adjacent to the upper shelf 18 is a pill selection compartment generally defined by a pair of opposing lateral side walls 24, 26, a back wall 28, a projecting portion of the plate 12, a first gate 38, a second gate 32, and the ends and sides of a series of bars 34. The volume and shape of the pill selection compartment can be altered by pivoting the plate 12. Such pivoting is accomplished by means of a screw 30 extending between the cover 10 and the upper ledge 18. The plate 12 abuts the screw 30 such that rotation of the screw 30 (in either a clockwise or counter-clockwise direction) causes the plate 12 to pivot, thereby raising or lowering the projecting portion of the plate 12 in the region of the pill selection compartment, as best shown in FIG. 2. The pivoting of the plate 12 also varies the height of the plate 12 above the upper ledge 18, thereby providing a means for partially controlling the arrangement of any pills on the upper ledge 18 such that the pills lie in a single layer and are not on top of one another.

A second translatable gate 32 is normally disposed between the pill selection compartment and the exit compartment and at least partially defines the pill selection compartment. The second gate 32 comprises an "L" shaped plate in which the larger surface of the plate is substantially coplanar with the upper ledge 18. The second gate 32 normally extends totally from the side wall 24 to the side wall 26 and from the back wall 28 substantially to the upper ledge 18. As will be explained later herein, the second gate 32 is selectively translatable to a nonextended position.

Figure 3:
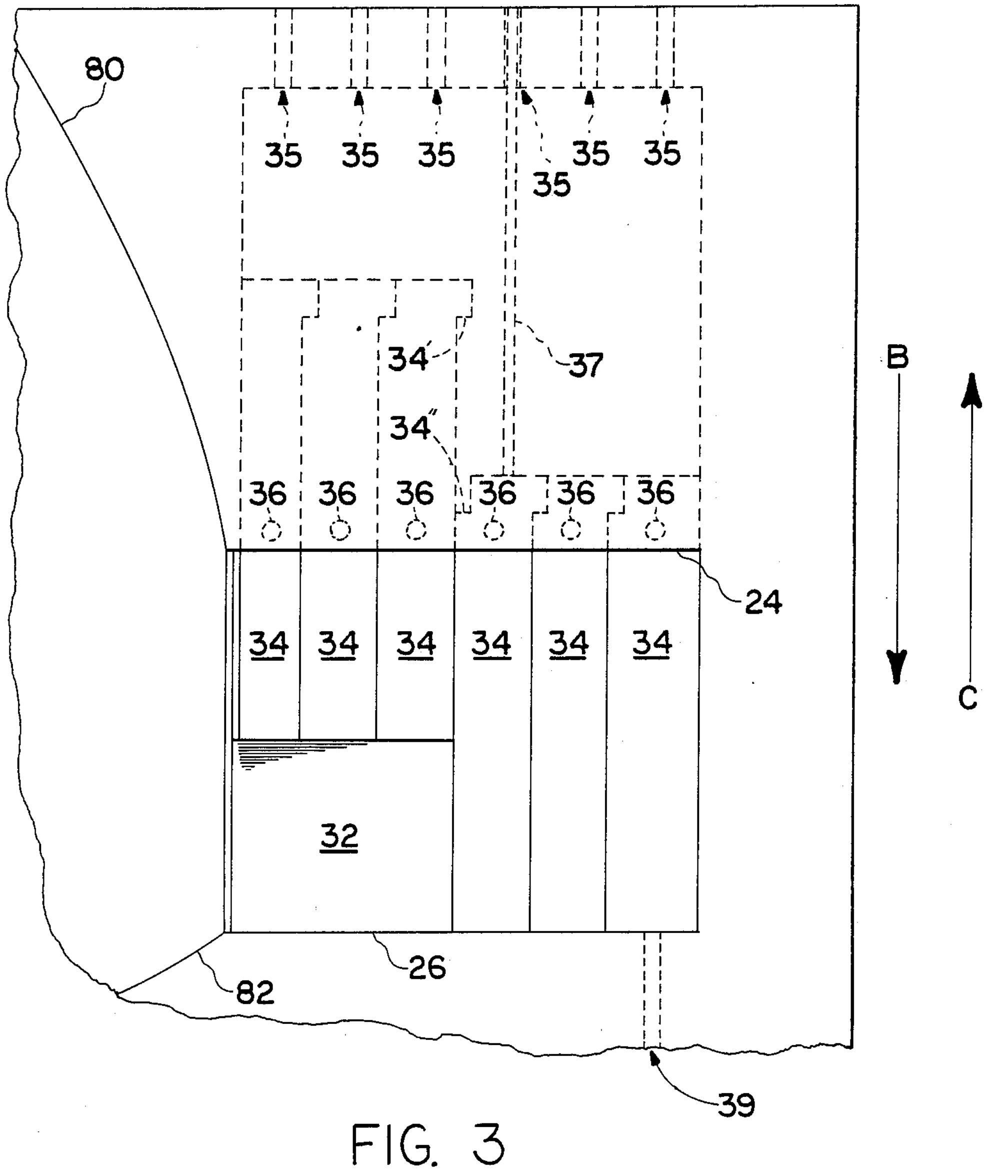
FIG. 3 is a schematic representation of the pill selection compartment including a series of bars arranged laterally side-by-side.

As best shown in FIGS. 1 through 3, a series of bars 34 arranged laterally side-by-side in a substantially planar array also at least partially extends across the pill selection compartment. The bars 34 are disposed above the second gate 32, and the plane of the bars 34 is substantially parallel with the larger surface of the second gate 32 and with the surface of the upper ledge 18. The bars 34 may be longitudinally positioned and the plate 12 may be pivoted to form and to vary and adjust the configuration of the pill selection compartment above the second gate 32. The pill selection compartment as shown in FIGS. 1 and 3 is further defined by the longitudinal ends of the bars 34 relatively close to the upper ledge 18, by the lateral edge of a bar 34 relatively far from the upper ledge 18, and at least a portion of the lateral side wall 26. Each of the bars 34 is provided with interlocking steps 34', 34" so that longitudinal movement of the bars 34 is coordinated. Longitudinal translation of any bar 34 in the direction of the arrow B in FIG. 3 will automatically cause each of the bars 34 farther from the upper ledge 18 also to be translated across the pill selection compartment. If the bar 34 farthest from the upper ledge 18 is longitudinally translated in the direction of the arrow C in FIG. 3 to a position of nonextension, then all of the other bars 34 will automatically be in a position of nonextension.

In order to longitudinally translate each of the bars 34 in the direction of the arrow B, the container is provided with a series of holes 35 corresponding in number to the bars. Each of the holes 35 extends from a lateral side wall of the container (the upper lateral side wall with reference to FIG. 3) in substantial alignment with the corresponding bar 34. A thin wire rod 37 is adapted to extend through each of the holes and to contact a longitudinal end of a corresponding bar 34 whereby further insertion of the thin rod into the hole will push the corresponding bar 34 and cause the same to longitudinally translate in the direction of the arrow B. The bars 34 are translated to a position of nonextension by means of a hole 39 extending from the other lateral side wall (the lower lateral side wall with reference to FIG. 3) in substantial alignment with the bar 34 farthest from the upper ledge 18. Again, a thin rod 37 is inserted into the hole to push the corresponding bar 34 in the direction of the arrow C into a position of nonextension. As previously stated, such translation of this particular bar 34 will cause each of the other bars 34 also to assume a position of nonextension.

Figure 9:
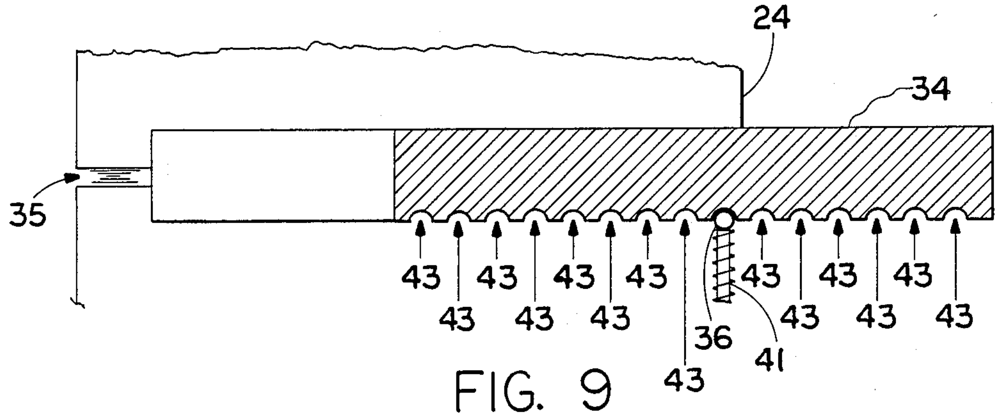
FIG. 9 is a cross sectional schematic side view representation of one of the bars shown in FIGS. 3 and 5 in cooperation with a ball bearing and spring detente mechanism.

Each of the bars 34 may be maintained in the position of extension, partial extension, or nonextension by means of a corresponding detente provided beneath the lower surface of each bar 34. As best shown in FIGS. 3 and 9, the detente comprises a ball bearing 36 biased by a compression spring 41. The surface of the bar 34 facing the corresponding detente is provided with a row of arcuately shaped depressions 43, each depression 43 having a shape substantially conforming with the shape of the ball bearing 36 such that the ball bearing 36 may protrude into any one of the depressions 43 depending upon the longitudinal position of the bar 34. Each of the ball bearings 36 is resiliently biased into an interfacing engagement with one depression 43 in a corresponding row of depressions 43. Whenever a ball bearing 36 protrudes into a depression 43, a preselected, minimum amount of longitudinally directed force must be applied to the corresponding bar 34 in order to longitudinally translate the bar 34. When the bars 34 have been appropriately positioned in a desired degree of extension, partial extension or nonextension to thereby define a portion of the pill selection compartment, the holes 35 in alignment with the bars may be plugged so that the thin rod 37 cannot be inserted into the holes 35 to alter the position of the bars 34. Thus, the volume and shape of the pill selection compartment may be selectively changed by pivoting the plate 12 by means of the screw 30 and by selectively translating and positioning the bars 34. The volume and shape of the pill selection compartment are chosen so that only one pill at a time can be disposed within the pill selection compartment. Consequently, the size and shape of the pill selection compartment are selected to conform substantially with the size and shape of a pill disposed within the container.

Figure 5:
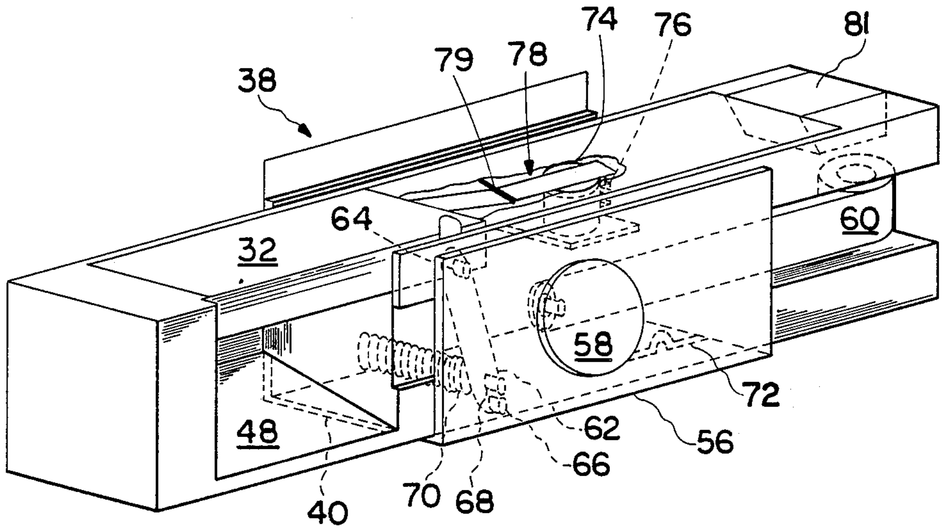
FIG. 5 is a perspective view of a gate system utilized in the medication dispenser shown in FIG. 1.

The medication dispenser further includes a flexible first gate 38 extending from the free end of a leg of a "U" shaped translatable trough or carriage 40, as best shown in FIGS. 2 and 5. The first gate 38 selectively extends between the pill selection compartment and the main compartment and at least partly defines the pill selection compartment. The first gate 38 selectively extends from the lateral side wall 24 to the other lateral side wall 26 of the pill selection compartment so as to segregate the pill selection compartment from the main compartment—specifically the region of the main compartment above the upper ledge 18. The first gate 38 is flexible so that translation of the first gate 38 to a position of extension will not crush any pills in the path of translation, but will simply gently urge any pill so positioned either into the pill selection compartment or back onto the upper ledge 18.

Figure 4:
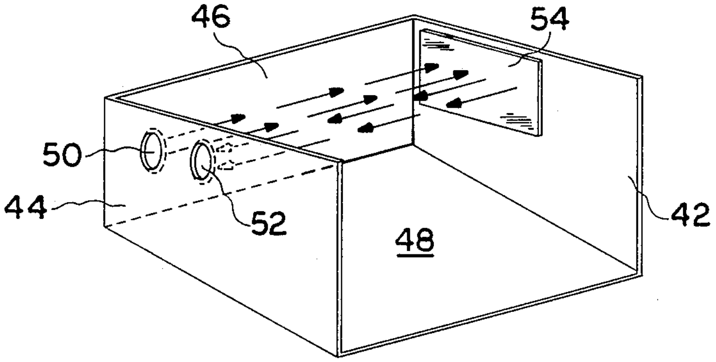

An exit passageway, chute or compartment is disposed below the second gate 32 and is in communication with the container exterior. The exit compartment generally includes laterally opposing side walls 42, 44, a back wall 46 and an inclined bottom wall 48, as best shown in FIGS. 2, 4 and 5. The exit compartment further includes a selectively activated light source 50 and a photodiode 52 mounted on one of the lateral side walls 44 and a mirror 54 mounted on the other lateral side wall 42 to reflect light emanating from the light source 50 onto the photodiode 52.

The upstanding leg of the "U" shaped carriage 40 upon which the first gate 38 is not mounted functions as a third gate 56 that is selectively extensible across the exit compartment to segregate the exit compartment from the container exterior.

A handle or knob 58 is secured to the upstanding leg of the carriage 40 functioning as a third gate 56 to assist in the manual translation of the carriage 40. One end of a wound band of metal functioning as a negator spring 60 is attached to the knob 58 and the carriage 40. The negator spring 60 biases the carriage 40 to a position where the first gate 38 and the third gate 56 are both in a position of nonextension.

Figure 6:
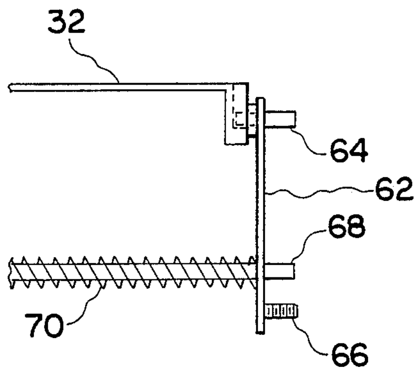
FIGS. 6 and 7 are a side view and an end view, respectively, of a gate translation system shown in FIG. 5.
Figure 7:
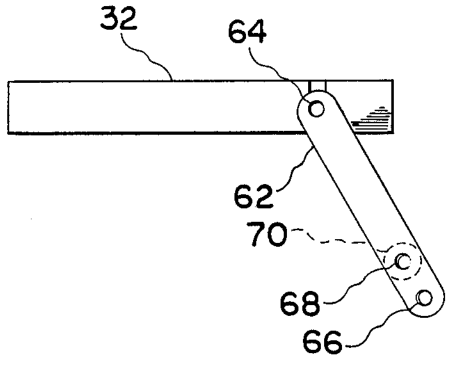
Figure 8:
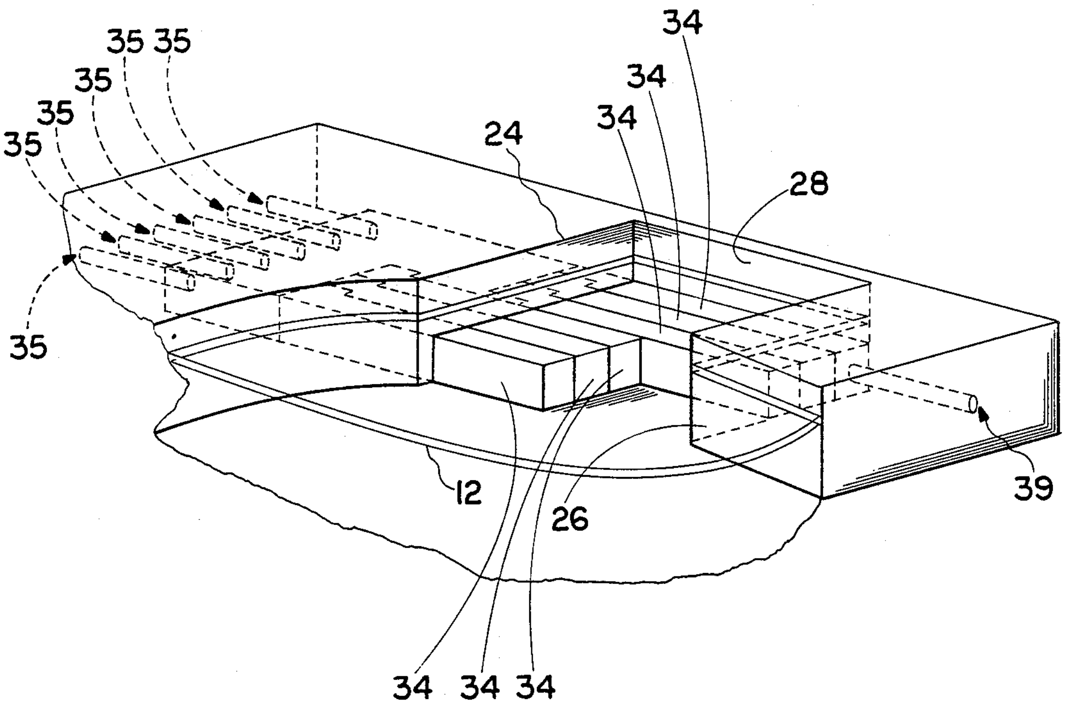
FIG. 8 is a perspective schematic representation of the pill selection compartment including a series of bars arranged laterally side-by-side.

As best shown in FIGS. 5, 6 and 7, the second gate 32 is pivotally connected to an end of an arm 62 by means of a pin 64. The other end of the arms 62 is provided with a protruding lug 66. The arm 62 is also pivoted about a stationary rod 68 extending from a wall of the container through the arm 62, near the lug 66, and between the lug 66 and the pin 64. A helical torsional spring 70 is mounted about the rod 68 and is attached to the arm 62 such that the second gate 32 is biased into a position of extension. A bulging lug 72 is mounted on the bottom of the carriage 40 and is adapted for contact with the lug 66. As best shown in FIGS. 5 through 7, the translation of the carriage 40 against the bias of the negator spring 60 will cause the lug 72 to contact and move the lug 66, which in turn causes the arm 62 to pivot or rotate about the rod 68, which in turn causes the second gate 32 to move to a nonextended position.

The medication dispenser also includes means for preventing the second gate 32 from translating into a nonextended position. As shown in FIG. 5, the medication dispenser may be provided with a solenoid 74 disposed adjacent to an extension spring 76 operatively attached to an end of a pivotable, narrow, strong strip 78 of metal rotatably mounted on a pivot pin 79. The action of the extension spring 76 normally biases the metal strip 78 into a pivoted position where an end of the metal strip 78 abuts the end of the second gate 32 to prevent the second gate 32 from translating to a nonextended position. However, when the solenoid 74 is actuated, the metal strip 78 pivots against the bias of the extension spring 76 and moves out of the path of translation of the second gate 32 and thereby permits the second gate 32 to move to a nonextended position. The solenoid 74 is electrically connected to and is selectively activated by a programmable computer 81 designed to control the number of pills dispensed during any given period of time. Preferably the solenoid 74 is activated automatically by an electrical switch (not shown) when and only when the first gate 38 and the third gate 56 are both in or moving toward an extended position. The photodiode 52 is also electrically connected to the computer 81 so that the dispensing of a pill can be monitored and recorded by the interruption of the light beam emanating from the light source 50.

In operation, the container is shaken or tilted so that at least one pill is deposited upon the upper ledge 18. Thereafter, the container is additionally shaken or tilted to move a pill from the upper ledge 18 into the pill selection compartment above the second gate 32, which is in an extended position. The pill selection compartment has been configured so that only one pill can be disposed within the compartment at any instant. To assist the movement of a pill deposited on the upper ledge 18 into the pill selection compartment, the container is provided around the upper ledge 18 with gently curving side walls 80, 82 that converge toward the pill selection compartment.

When a pill is disposed within the pill selection compartment, the knob 58 is manually moved to translate the carriage 40 against the bias of the negator spring 60. Such translation of the carriage 40 causes the first gate 38 to extend across interior opening of the pill selection compartment and to segregate the pill selection compartment from the main compartment, thus isolating a single pill within the pill selection compartment. Such translation of the carriage 40 also causes the third gate 56 to extend across the exit compartment and to segregate the exit compartment from the container exterior. Such translation of the carriage 40 further causes the lug 72 to engage and move the lug 66, which in turn causes the second gate 32 to move to a nonextended position (presuming the computer 81 has activated the solenoid 74). Thus, it will be appreciated that translation of the carriage 40 by means of the handle 58 causes the single, isolated pill within the pill selection compartment to drop down into the exit compartment. When the pill drops into the exit compartment, the light beam emanating from the light source 50 is interrupted, and the interruption can be detected by the photodiode 52. Such detection indicates that a pill has passed from the pill selection compartment to the exit compartment. Preferably, the light source is activated automatically by an appropriately positioned electrical switch (not shown) when and only when the first gate 38 and the third gate 56 are both in or moving toward an extended position. When the third gate 56 is in an extended position, a human finger, a tool or the like cannot be inserted from the container exterior into the exit compartment to interrupt the light beam, which otherwise might cause false indications that a pill had dropped from the pill selection compartment to the exit compartment.

When the carriage 40 has been translated against the bias of the negator spring 60 and the knob 58 is manually released, the carriage 40 translates in response to the bias of the negator spring 60 into a position where the first gate 38 and the third gate 56 are both in a non-extended position and where the second gate 32 assumes an extended position in response to the bias of the coil spring 70. Such return of the carriage 40 to its initial position permits the pill in the exit compartment to be removed from the container and permits yet another pill to be maneuvered into the pill selection compartment above the second gate 32. Then the above-described process can be repeated.

It should be appreciated that the second gate 32 cannot be moved out of an extended position unless the metal strip 78 is moved out of the path of translation of the second gate 32 by the appropriate activation of the solenoid 74 by the computer 81. Preferably, the solenoid 74 can be activated only when predetermined conditions are satisfied such as when the number of pills dispensed from the container within a certain number of hours does not exceed a maximum prescribed number, the number of pills dispensed within a day does not exceed a certain maximum prescribed number, etc. Thus, the solenoid 74 and the photodiode 52 can be interconnected by means of the programmable computer 81 so that a record can be made of each time when a pill passes from the pill selection compartment to the exit compartment and so that the medication dispenser will not allow a pill to be dispensed unless certain conditions are satisfied, one of which is the number of pills already dispensed. Preferably, the container is provided with a light source 84 also electrically connected to the computer 81 and which is selectively activated when the conditions are satisfied to indicate to the user of the medication dispenser that conditions are satisfactory for the dispensing of at least one pill. Alternatively a liquid crystal display can be substituted for light source 84 for relating information that constantly apprises the user when medication should be taken. Also a bell or buzzer could be substituted for the light source 84.

For example, if a patient were scheduled to take two pills at 8:00 a.m., two pills at noon, and two pills at 6:00 p.m., the computer 81 would be programmed so that the light source 84 would be lighted from 8:00 a.m. to 8:30 a.m., from noon to 12:30 p.m., and from 6:00 p.m. to 6:30 p.m. unless within these time periods the photodiode 52 detects two interruptions of the light beam emanating from the light source 50. Thus, the light source 84 is lighted to remind a patient to take pills and will shut off once two pills have been dispensed. Similarly only within these time periods and only until two interruptions are detected will the solenoid 74 and the light source 50 be activated by the computer 81 when the carriage 40 is translated. Moreover, the computer 81 can be programmed to signal an alarm if less than two pills have been dispensed when five minutes remains in the time period, and the computer 81 can be programmed to record or display a message to the effect that an insufficient number of pills have been dispensed if less than two pills have been dispensed in the one-half hour time period. Obviously the length of the time period can be selectively varied by appropriately programming the computer 81.

Although particular embodiments of the present invention have been described and illustrated herein, it should be recognized that modifications and variations may readily occur to those skilled in the art and that such modifications and variations may be made without departing from the spirit and scope of our invention. Consequently, our invention as claimed below may be practiced otherwise than is specifically described above.

We claim:

1. A dispenser for pills or the like comprising:

a receptacle having an interior compartment normally containing pills or the like, having an exit compartment in communication with the exterior of the receptacle, and having a pill selection compartment disposed intermediately to and in communication with the interior compartment and the exit compartment whereby a pill may be dispensed from said receptacle by passing from the interior compartment, through the pill selection compartment, and to the exit compartment;

a first gate selectively extensible between the interior compartment and the pill selection compartment, such that a pill can pass from the interior compartment to the pill selection compartment when said first gate is not so extended and such that a pill can not pass from the interior compartment to the pill selection compartment when said first gate is so extended;

means for selectively varying the configuration of the pill selection compartment such that at any instant only a single pill can be disposed within the pill selection compartment; and means for preventing a pill from passing from the pill selection compartment to the exit compartment when said first gate is not extended and for permitting a pill to pass from the pill selection compartment to the exit compartment when said first gate is extended.

2. A dispenser for pills or the like according to claim 1 further comprising means for detecting a pill substantially immediately after the pill has passed from the pill selection compartment to the exit compartment.

3. A dispenser for pills or the like according to claim 2 wherein said detecting means includes a light source for producing a light beam and a photodiode responsive to the light beam.

4. A dispenser for pills or the like according to claim 1 wherein said configuration varying means includes a series of bars arranged laterally side-by-side, each bar longitudinally translatable with respect to its laterally adjacent bars.

5. A dispenser for pills or the like according to claim 1 further including means for selectively preventing more than a selected number of pills from passing from the pill selection compartment to the exit compartment during a selected time period.

6. A dispenser for pills or the like according to claim 1 wherein said preventing and permitting means comprises a second gate selectively extensible between the pill selection compartment and the exit compartment so that a pill can not pass from the pill selection compartment to the exit compartment when said second gate is so extended.

7. A dispenser for pills or the like according to claim 6 further including means for selectively preventing more than a selected number of pills from passing from the pill selection compartment to the exit compartment during a selected period of time.

8. A dispenser for pills or the like according to claim 1 wherein the pill selection compartment is formed at least in part by at least one wall having an adjustable position and wherein said configuration varying means includes said adjustable position wall.

9. A dispenser for pills or the like comprising:

a receptacle having an interior compartment normally containing pills or the like, having an exit compartment in communication with the exterior of the receptacle, and having a pill selection compartment disposed intermediately to and in communication with the interior compartment and the exit compartment whereby a pill may be dispensed from said receptacle by passing from the interior compartment, through the pill selection compartment, and to the exit compartment;

a first gate selectively extensible between the pill selection compartment and the exit compartment such that a pill can pass from the pill selection compartment to the exit compartment when said first gate is not so extended and such that a pill can not pass from the pill selection compartment to the exit compartment when said first gate is so extended;

means for selectively varying the configuration of the pill selection compartment such that at any instant only a single pill can be disposed within the pill selection compartment; and means for preventing a pill from passing from the interior compartment to the pill selection compartment when said first gate is not extended and for permitting a pill to pass from the interior compartment to the pill selection compartment when said first gate is extended.

10. A dispenser for pills or the like according to claim 9 wherein said configuration varying means includes a series of bars arranged laterally side-by-side, each bar longitudinally translatable with respect to its laterally adjacent bars.

11. A dispenser for pills or the like according to claim 10 wherein said first gate is substantially planar and wherein said first gate and said series of bars are substantially overlapping.

12. A dispenser for pills or the like according to claim 10 wherein said preventing means includes a second gate selectively extensible between the interior compartment and the pill selection compartment such that a pill can pass from the interior compartment to the pill selection compartment when said second gate is not so extended and such that a pill can not pass from the interior compartment to the pill selection compartment when said second gate is so extended.

13. A dispenser for pills or the like according to claim 12 further including means for permitting said second gate to extend only when said first gate is not extended.

14. A dispenser for pills or the like according to claim 9 further including means for selectively preventing more than a selected number of pills from passing from the interior compartment, through the pill selection compartment and to the exit compartment during a selected time period.

15. A dispenser for pills or the like according to claim 9 further comprising means for detecting the presence of a pill in the exit compartment substantially immediately after the pill has passed by said first gate.

16. A dispenser for pills or the like according to claim 15 wherein said detecting means includes a light source for producing a light beam and a photodiode responsive to the light beam.

17. A dispenser for pills or the like according to claim 15 further comprising a third gate selectively extensible across the exit compartment.

18. A dispenser for pills or the like according to claim 9 wherein the pill selection compartment is at least partly defined by an adjustable position wall and wherein the dispenser further comprises means for adjusting the position of the wall, whereby adjusting the position of the wall varies the shape of the pill selection compartment.

19. A dispenser for pills or the like comprising:

a main compartment normally containing pills or the like, said main compartment being at least partially defined by a floor upon which the pills in said compartment normally rest when said dispenser is oriented substantially in a first position.

a ledge capable of supporting a plurality of pills simultaneously when said dispenser is oriented substantially in the first position, said ledge exposed to and in communication with said main compartment, said ledge disposed vertically higher than said floor when said dispenser is oriented substantially in the first position;

a pill selection compartment in communication with said ledge and said main compartment, whereby a pill deposited on said ledge may be maneuvered into said pill selection compartment;

an exit compartment in communication with said pill selection compartment and the exterior of the dispenser;

means for selectively varying the configuration of said pill selection compartment such that at any instant only a single pill can be disposed within said pill selection compartment;

a first gate selectively extensible between said pill selection compartment and said exit compartment such that a pill can pass from the pill selection compartment when said first gate is not so extended and such that a pill can not pass from said pill selection compartment to said exit compartment when said first gate is so extended; and means for preventing a pill from being maneuvered from said ledge into said pill selection compartment when said first gate is not so extended.

20. A dispenser for pills or the like according to claim 19 further including means for selectively preventing more than a selected number of pills from being maneuvered into said pill selection compartment and passing to said exit compartment during a selected time period.

21. A dispenser for pills or the like according to claim 19 wherein said configuration varying means includes a series of bars arranged laterally side-by-side, each bar longitudinally translatable with respect to its laterally adjacent bars.

22. A dispenser for pills or the like according to claim 19 further comprising means for electrically detecting the presence of a pill substantially immediately after the pill has passed through the pill selection compartment.

23. A dispenser for pills or the like according to claim 19 further comprising a substantially transparent wall positioned such that a person outside said dispenser can view said ledge and said pill selection compartment.

24. A dispenser for pills or the like according to claim 19 wherein said pill selection compartment is formed at least in part by at least one wall having an adjustable position and wherein said configuration varying means includes said adjustable position wall.

25. A dispenser for pills or the like according to claim 19 further including means for selectively preventing more than a selected number of pills from passing from said pill selection compartment to said exit compartment during a selected time period.

26. A dispenser for pills or the like comprising:

a receptacle having an interior compartment normally containing pills or the like and having a passageway extending from the interior compartment to the exterior of said receptacle through which a pill contained in said interior compartment may be dispensed from said receptacle;

a pill selection compartment in said passageway;

means for adjusting the configuration of said pill selection compartment such that at any instant only a single pill can be disposed within said pill selection compartment;

a gate selectively extensible across the passageway such that when said gate is so extended, a pill is prevented from passing from said pill selection compartment to the exterior of said receptacle, and when said gate is not so extended, a pill may pass from said pill selection compartment to the exterior of said receptacle; and means for preventing a pill from entering said pill selection compartment when said gate is not extended across the passageway.

27. A dispenser for pills or the like according to claim 26 further comprising means for detecting a pill in said passageway.

28. A dispenser for pills or the like according to claim 27 wherein said detecting means includes a light source for producing a light beam in the passageway and a sensor responsive to the light beam.

29. A dispenser for pills or the like according to claim 26 wherein said configuration adjusting means includes a series of bars arranged laterally side-by-side at least partly defining said pill selection compartment, each bar longitudinally translatable with respect to its laterally adjacent bars.

30. A dispenser for pills or the like according to claim 26 wherein said receptacle includes a substantially transparent wall positioned such that a person outside said dispenser can view said pill selection compartment and a portion of said passageway.

31. A dispenser for pills or the like according to claim 26 wherein said pill selection compartment is formed at least in part by at least one wall having an adjustable position and whereby said configuration adjusting means includes said adjustable position wall.

32. A dispenser for pills or the like according to claim 26 further including means for selectively preventing more than a selected number of pills from passing from said pill selection compartment to the exterior of said receptacle during a selected time period.

33. A dispenser for pills or the like comprising:

a main compartment normally containing pills or the like, said main compartment being at least partially defined by a floor upon which the pills in said compartment normally rest when said dispenser is oriented substantially in a first position;

a ledge capable of supporting a plurality of pills simultaneously when said dispenser is oriented substantially in the first position, said ledge exposed to and in communication with said main compartment, said ledge disposed vertically higher than said floor when said dispenser is oriented substantially in the first position;

a pill selection compartment in communication with said ledge and said main compartment and in communication with the dispenser exterior by a passageway, whereby a pill deposited on said ledge may be maneuvered into said pill selection compartment;

a gate selectively extensible across said passageway such that when said gate is so extended a pill is prevented from passing from said pill selection compartment to the dispenser exterior, and when said gate is not so extended, a pill may pass from said pill selection compartment to the dispenser exterior;

means for adjusting the configuration of said pill selection compartment whereby at any instant only a single pill can be disposed within said pill selection compartment; and means for preventing a pill from being maneuvered into said pill selection compartment when said gate is not extended.

34. A dispenser for pills or the like according to claim 33 further including means for selectively preventing more than a selected number of pills from being maneuvered into said pill selection compartment and passing through said passageway within a selected time period.

35. A dispenser for pills or the like according to claim 33 wherein said adjusting means includes a series of bars arranged laterally side-by-side, each bar longitudinally translatable with respect to its laterally adjacent bars.

36. A dispenser for pills or the like according to claim 33 further comprising means for detecting the presence of a pill in said passageway.

37. A dispenser for pills or the like according to claim 33 further comprising a substantially transparent wall positioned such that a person outside the dispenser can view said ledge and said pill selection compartment.

38. A dispenser for pills or the like according to claim 33 wherein said pill selection compartment is formed at least in part by at least one wall having an adjustable position and wherein said configuration adjusting means includes said adjustable position wall.

39. A dispenser for pills or the like according to claim 33 further including means for selectively preventing more than a selected number of pills from passing from said pill selection compartment to the dispenser exterior during a selected time period.

40. A receptacle for storing and dispensing pills, the receptacle being oriented normally in an upright position, comprising:

a chamber in which the pills may be contained in a loose and nonordered state;

a ledge capable of supporting a plurality of pills simultaneously, exposed to and in communication with said chamber;

a pill selection compartment in communication with said ledge and having a shape substantially conforming to the configuration of a pill along at least a portion of the perimeter thereof, whereby moving and orienting the receptacle permits a number of pills less than that needed to fill the ledge to be deposited on and supported by said ledge such that the pills deposited on said ledge are free to move on said ledge and whereby a single pill deposited on said ledge may be maneuvered into the pill selection compartment;

means for altering the configuration of said pill selection compartment to substantially conform to the configuration of any pill;

means for selectively removing from the rceptacle a pill that has been maneuvered into the pill selection compartment; and means for electronically sensing the pill as the pill is being removed from the receptacle.

41. A receptacle according to claim 40 further comprising a substantially transparent wall portion positioned such that a person outside the receptacle may view said ledge, said pill selection compartment, a pill deposited on said ledge, a pill being maneuvered into said pill selection compartment, the position and orientation of a pill relative to said pill selection compartment, and a pill in said pill selection compartment.

42. A receptacle according to claim 40 wherein said altering means includes a series of bars arranged laterally side-by-side, each bar longitudinally translatable with respect to its laterally adjacent bars.

43. A receptacle according to claim 40 wherein the pill selection compartment is positioned such that a pill drops from one horizontal level to a lower horizontal level as the pill is being removed from the receptacle.

44. A receptacle according to claim 40 wherein the chamber includes a chamber floor upon which the pills normally rest, said chamber floor generally disposed at a first horizontal level when the receptacle is in an upright position, wherein said ledge is generally disposed at a second horizontal level when the receptacle is in an upright position, and wherein the first horizontal level is lower than the second horizontal level.

45. A receptacle according to claim 40 further comprising means for preventing a pill from being maneuvered into said pill selection compartment when another pill previously maneuvered into said pill selection compartment is being removed from the receptacle.

46. A receptacle according to claim 40 wherein said pill selection compartment is formed at least in part by at least one wall having an adjustable position and wherein said altering means includes said adjustable position wall.

47. A receptacle according to claim 40 further including means for selectively preventing more than a selected number of pills from being removed from the receptacle during a selected time period.

48. A receptacle for storing and dispensing pills or the like comprising:

a main compartment normally containing pills; a pill selection compartment in communication with said main compartment and into which a pill must be maneuvered in order to be dispensed from the receptacle, said pill selection compartment being defined by at least one wall, said at least one wall being selectively adjustably positionable;

means for selectively adjusting the position of said at least one adjustably positionable wall whereby the configuration of said pill selection compartment may be selectively varied to permit only a single pill to be disposed therein at any instant; and means for preventing a pill from being maneuvered into said pill selection compartment until a pill previously maneuvered into said pill selection compartment has been dispensed from the receptacle.

49. A receptacle for storing and dispensing pills or the like according to claim 48 wherein said at least one wall is at least two walls, said pill selection compartment being defined by said at least two walls, each of said two walls being selectively adjustably positionable, and wherein said at least one wall adjusting means selectively adjusts the position of each of said at least two adjustably positionable walls.

50. A receptacle for storing and dispensing pills or the like according to claim 49 wherein said at least two walls is at least three walls, said pill selection compartment being defined by said at least three walls, said at least three walls being selectively adjustably positionable and wherein said means for selectively adjusting the position of said at least two walls adjustably positions said at least three walls whereby the configuration of said pill selection compartment may be selectively varied to permit only a single pill to be disposed therein at any instant.

51. A receptacle for storing and dispensing pills according to claim 48 wherein said at least one selectively adjustably positionable wall includes a series of bars arranged in a side-by-side arrangement, each bar translatable with respect to its adjacent bars.

52. A receptacle for storing and dispensing pills according to claim 51 further comprising means for causing the concurrent translation of a bar when one of its adjacent bars is translated.

53. A receptacle for storing and dispensing pills according to claim 48 further including means for selectively dispensing from the receptacle a pill that has been maneuvered into said pill selection compartment.

54. A receptacle for storing and dispensing pills according to claim 48 further including means for electrically sensing a pill as the pill is being dispensed from the receptacle.

55. A receptacle for storing and dispensing pills according to claim 48 wherein said main compartment includes a ledge capable of supporting a plurality of pills simultaneously such that a pill supported on said ledge can be maneuvered directly into said pill selection compartment.

56. A receptacle for storing and dispensing pills according to claim 55 wherein said pill selection compartment is formed at least in part by a substantially transparent wall portion positioned such that a person outside the receptacle may view said ledge and said pill selection compartment.

57. A receptacle for storing and dispensing pills according to claim 48 further including means for selectively preventing more than a selected number of pills from being dispensed from the receptacle during a selected time period.

58. A medication dispenser comprising:

an interior compartment normally containing the medication;

a passageway extending from said interior compartment to the exterior of said dispenser through which the medication in said interior compartment may be removed from said dispenser said passageway including a medication selection compartment through which the medication must pass when passing through said passageway;

means for selectively preventing the medication from passing from said interior compartment and into said medication selection compartment;

means for selectively preventing the medication from passing from said medication selection compartment to the exterior of said dispenser;

means for detecting the presence of the medication in said passageway; and means responsive to said detecting means for determining whether at least one selected condition is satisfied, said determining means operably interconnected to at least one of said preventing means such that said at least one of said preventing means prevents the passing of the medication whenever such condition is unsatisfied and permits the passing of the medication whenever such condition is satisfied.

59. A medication dispenser according to claim 58 further comprising a means for determining a time when the medication is present in said passageway.

60. A medication dispenser according to claim 58 wherein said detecting means includes a light source for producing a light beam and a sensor responsive to the light beam.

61. A medication dispenser according to claim 58 wherein the at least one selected condition is whether a selected amount of the medication has been detected within said passageway by said detecting means within a selected time interval.

62. A medication dispenser according to claim 58 further comprising a programmable computer and means for operably interconnecting said detecting means and said programmable computer, and wherein said programmable computer is responsive to said detecting means.

63. A medication dispenser according to claim 59 further comrising a programmable computer and means for operably interconnecting said time determining means and said programmable computer, and wherein said programmable computer is responsive to said time determining means.

64. A medication dispenser according to claim 58 wherein said determining means comprises a programmable computer.

65. A medication dispenser according to claim 58 further comprising a substantially transparent wall positioned such that a person outside said dispenser can determine whether any medication is disposed within the medication selection compartment.

66. A medication dispenser according to claim 58 further comprising means for determining the time when the at least one selected condition is satisfied.

67. A medication dispenser according to claim 58 wherein said interior compartment includes a bottom shelf and a ledge capable of supporting a plurality of pills simultaneously, wherein said ledge is disposed vertically higher than the bottom shelf of said interior compartment when said dispenser is oriented substantially in a first position and wherein said ledge is in communication with said medication selection compartment.

68. A medication dispenser according to claim 58 wherein said means for selectively preventing the medication from passing from said interior compartment into said medication selection compartment comprises a gate selectively extensible across said passageway.

69. A medication dispenser according to claim 58 wherein said means for selectively preventing the medication from passing from said medication selection compartment to the exterior of said dispenser comprises a gate selectively extensible across said passageway.

70. A medication dispenser according to claim 58 further comprising means for regulating each of said selective preventing means such that at least one of said selective preventing means will always be positioned to prevent medication from passing through said passageway.

71. A method of dispensing medication comprising the steps of:

providing a dispenser comprising:

an interior compartment normally containing the medication;

a passageway extending from said interior compartment to the exterior of said dispenser through which the medication in said interior compartment may be removed from said dispenser, said passageway including a medication selection compartment through which the medication must pass when passing through said passageway;

a first gate selectively extensible across said passageway between said interior compartment and said medication selection compartment for preventing the medication from passing from said interior compartment and into said medication selection compartment when said first gate is so extended;

a second gate selectively extensible across said passageway between said medication selection compartment and the exterior of said dispenser for preventing the medication from passing from said medication selection compartment to the exterior of said dispenser when said second gate is so extended;

means for detecting the presence of the medication within said passageway; and means for determining whether at least one selected condition is satisfied and for retracting at least one of said gates only if said selected condition has been satisfied;

placing the medication in the interior compartment; retracting said first gate to a nonextended position and moving the medication from said interior compartment and into said medication selection compartment while said first gate is retracted;

retracting said second gate to a nonextended position and moving the medication from said medication selection compartment to the exterior of said dispenser while said second gate is retracted;

determining with said determining means whether said at least one selected condition has been satisfied and retracting with said determining means at least one of said gates only if said selected condition has been satisfied; and detecting the medication by the detection means as the medication passes through said passageway.

72. A method of dispensing medication according to claim 71 wherein said dispenser further comprises a ledge capable of supporting the medication, said ledge exposed to and in communication with said interior compartment and said passageway, and wherein said method comprises the further step of moving and orienting said dispenser so that first the medication is moved from said interior compartment and onto said ledge and then from said ledge and into said passageway.

73. A method of dispensing medication according to claim 71 wherein said dispenser includes a time determining means for determining the time when a pill has been removed and when said at least one selected condition is satisfied and wherein one of said selected conditions is whether a selected amount of medication has been detected by said detecting means in said passageway within a selected time interval.

74. A method of dispensing medication comprising the steps of:

providing a dispenser comprising: an interior compartment normally containing the medication;

a passageway extending from said interior compartment to the exterior of said dispenser through which the medication in said interior compartment may be removed from said dispenser, said passageway including a medication selection compartment through which the medication must pass when passing through said passageway;

means for selectively preventing the medication from passing from said interior compartment and into said medication selection compartment;

means for selectively preventing the medication from passing from said medication selection compartment to the exterior of said dispenser;

means for detecting the presence of the medication in said passageway; and means responsive to said detecting means for determining whether at least one selected condition is satisfied, said determining means operably interconnected to at least one of said preventing means such that said at least one preventing means prevents the passing of the medication whenever such condition is unsatisfied and permits the passing of the medication whenever such condition is satisfied;

placing the medication in the interior compartment; determining whether such condition is satisfied, and if so, then:

moving the medication either from said interior compartment to said medication selection compartment and then to the exterior of said dispenser or from said medication selection compartment to the exterior of said dispenser; and detecting the medication by the detecting means substantially when the medication moves through said passageway.

75. A method of dispensing medication according to claim 74 wherein said dispenser further comprises means for determining the amount of medication detected by said detecting means during a selected time interval and comprising the further step of determining with said medication amount determining means the amount of the medication detected by said detecting means within the selected time interval and removing the medication only if less than a selected amount of the medication has been detected within such time interval.

76. A dispenser for medication such as pills or the like comprising:

an interior compartment normally containing the medication;

a passageway extending from said interior compartment to the exterior of said dispenser whereby medication may be dispensed from said dispenser by travelling from said interior compartment, through said passageway, and to the exterior of said dispenser; and means for selectively varying the size of a portion of said passageway, said selective varying means comprising a series of bars arranged laterally side-by-side, wherein each bar is longitudinally translatable with respect to its laterally adjacent bar.

77. A dispenser for medication such as pills or the like according to claim 76 wherein the adjacent surfaces of adjacent bars each possess cooperating, interacting projections such that the translation of one adjacent bar in at least one longitudinally translatable direction causes a concomitant translation of the other adjacent bar in the same longitudinally translatable direction.

78. A dispenser for medication such as pills or the like according to claim 77 wherein each projection is fashioned substantially in the form of a step.

79. A dispenser for medication such as pills or the like according to claim 77 wherein each of said projections comprises a surface oriented in a plane non-parallel with the longitudinally translatable direction.

80. A dispenser for medication such as pills or the like according to claim 77 wherein each of said projections comprises a substantially flat surface oriented in a plane substantially perpendicular to the longitudinally translatable direction.

81. A dispenser for medication such as pills or the like according to claim 77 wherein the translation of the one adjacent bar in an opposite, second longitudinally translatable direction fails to cause a concomitant translation of the other adjacent bar in such opposite, second longitudinally translatable direction.

82. A dispenser for medication such as pills or the like according to claim 77 wherein each of said adjacent bars longitudinally translate an equal distance concomitantly.

83. A dispenser for medication such as pills or the like according to claim 77 wherein said passageway is formed in part by a moveable wall for further varying the size of said portion of said passageway.

84. A dispenser for medication such as pills or the like according to claim 77 wherein one side of each adjacent bar comprises two separated, substantially flat surfaces, each separated surface oriented in a plane substantially parallel to the longitudinally translatable direction, and comprises a surface interconnecting said two separated surfaces, said interconnecting surface oriented in a plane non-parallel with the longitudinally translatable direction.

85. A dispenser for medication such as pills or the like according to claim 84 wherein said interconnecting surface is oriented in a plane substantially perpendicular to the longitudinally translatable direction.

86. A medication dispenser for pills and the like comprising:

an interior compartment normally containing the medication;

a passageway extending from the interior compartment to the exterior of said dispenser through which medication contained in said interior compartment may be dispensed from said dispenser; a medication selection compartment forming a part of said passageway through which the medication must pass when passing through said passageway;

a first selective obstructing means for selectively obstructing said passageway, thereby selectively preventing the medication from passing from said interior compartment into said medication selection compartment; a second selective obstructing means for selectively obstructing said passageway, thereby selectively preventing the medication from passing from said medication selection compartment to the exterior of said dispenser; a detecting means for detecting the presence of medication in said passageway;

a time determined means for determining when medication has been removed from said dispenser and when at least one selected condition has been satisfied; and a programmable computer responsive to said time determining means and said detecting means for selectively preventing more than a selected number of pills from passing to the exterior of said dispenser unless said at least one selected condition has been satisfied, said programmable computer controlling the operation of at least one of said selective obstructing means.

* * * * *